US012472542B1

(12) United States Patent
Lee et al.

(10) Patent No.: US 12,472,542 B1
(45) Date of Patent: Nov. 18, 2025

(54) MANUAL HIGH-PRESSURE PARTS WASHER

(71) Applicants: Jae Keun Lee, Daegu (KR); Sang Bae Jeon, Daegu (KR)

(72) Inventors: Jae Keun Lee, Daegu (KR); Sang Bae Jeon, Daegu (KR)

(73) Assignees: Jae Keun Lee, Daegu (KR); HI-TECH DIESEL CORP., Daegu (KR)

( * ) Notice: Subject to any disclaimer, the term of this patent is extended or adjusted under 35 U.S.C. 154(b) by 0 days.

(21) Appl. No.: 19/320,754

(22) Filed: Sep. 5, 2025

(30) Foreign Application Priority Data

Jul. 30, 2025 (KR) ........................ 10-2025-0103850

(51) Int. Cl.

| | |
|---|---|
| ***B08B 1/16*** | (2024.01) |
| ***B08B 1/30*** | (2024.01) |
| ***B08B 3/02*** | (2006.01) |
| ***B08B 3/14*** | (2006.01) |
| ***B08B 5/04*** | (2006.01) |
| ***B08B 13/00*** | (2006.01) |
| ***B08B 15/02*** | (2006.01) |
| ***F21V 33/00*** | (2006.01) |

(52) U.S. Cl.
CPC .............. *B08B 15/02* (2013.01); *B08B 1/165* (2024.01); *B08B 1/30* (2024.01); *B08B 3/022* (2013.01); *B08B 3/14* (2013.01); *B08B 5/04* (2013.01); *B08B 13/00* (2013.01); *F21V 33/004* (2013.01); *B08B 2203/0217* (2013.01); *B08B 2203/027* (2013.01)

(58) Field of Classification Search
None
See application file for complete search history.

(56) References Cited

U.S. PATENT DOCUMENTS

2014/0137904 A1* 5/2014 Suarez ...................... B08B 3/14
134/109

* cited by examiner

*Primary Examiner* — Levon J Shahinian
(74) *Attorney, Agent, or Firm* — PARK LAW FIRM

(57) ABSTRACT

The present invention relates to a manual high-pressure parts washer for safe and effective machine part washing while maintaining cleaning solution quality and protecting pump performance.

The washer includes a main body (10) with internal space divided by partition (11) and vertical plate (12) into upper operation room (13), lower machine room (14), and water storage room (15). An opening (16) with door (20) is formed at the upper side. A cleaning solution spray pipe (30) is provided inside the main body (10). A glove-shaped sleeve (40) extends into the operation room (13) through fixing hole (**22*a*) in door (20) for user hand insertion. Water supply unit (50) supplies cleaning solution from water storage room (15) to spray pipe (30**).

The operator arranges parts in operation room (13) and sprays cleaning solution for washing. This provides simple structure for easy parts cleaning.

5 Claims, 9 Drawing Sheets

MANUAL HIGH-PRESSURE PARTS WASHER

1. FIELD OF THE INVENTION

The present invention relates to a manual high-pressure parts washer designed to enable an operator to safely and effectively wash machine parts to be washed, maintain the quality of a cleaning solution by applying a filter unit, and protect the performance of a high-pressure pump.

2. DISCUSSION OF RELATED ART

Generally, to maintain parts of a mechanical device, it is necessary to wash the parts.

In order to wash parts of a mechanical device in this way, a cleaning solution needs to be sprayed onto the parts at high pressure, and in this case, there is a problem that the sprayed cleaning solution is dispersed into a surrounding area and contaminates the surrounding area.

Accordingly, various types of parts washers capable of washing internal parts have been developed and are being used as disclosed in numerous related art documents including Korean Laid-Open Patent No. 10-2007-0045801.

However, there are problems that these parts washers are complex in function, expensive, and cumbersome to use.

Accordingly, a new method of solving these problems is needed.

RELATED ART DOCUMENTS

Patent Document (Patent Document 1) Korean Laid-Open Patent No. 10-2007-0045801

SUMMARY OF THE INVENTION

The present invention relates to a manual high-pressure parts washer designed to enable an operator to safely and effectively wash machine parts to be washed, maintain the quality of a cleaning solution by applying a filter unit, and protect the performance of a high-pressure pump.

According to the present invention, there is provided a manual high-pressure parts washer including a main body (10) whose internal space is divided into an operation room (13) at an upper side, a machine room (14) at a lower side, and a water storage room (15) by a partition (11) and a vertical plate (12) provided therein and in which an opening (16) opened or closed by a door (20) is formed at the upper side, a cleaning solution spray pipe (30) provided inside the main body (10), a glove-shaped sleeve (40) which is provided to extend into the operation room (13) through a fixing hole (22*a*) formed in the door (20) and allows a user to insert his or her hand thereinto, and a water supply unit (50) which supplies a cleaning solution stored in the water storage room (15) to the cleaning solution spray pipe (30), wherein a through hole (11*a*) connecting the operation room (13) to the water storage room (15) is formed in the partition (11), a filter member (11*b*) is provided in the through hole (11*a*), and when a part is disposed in the operation room (13) and the part is washed the using cleaning solution sprayed through the cleaning solution spray pipe (30), contaminants and the cleaning solution removed from the part are discharged to the water storage room (15) through the filter member (11*b*), and the water supply unit (50) includes a submersible pump (51) provided in the water storage room (15) to press and discharge the cleaning solution stored in the water storage room (15), a filter unit (52) which is connected to the submersible pump (51) through a first connecting pipe (53) and filters the cleaning solution supplied from the submersible pump (51), a high-pressure pump (54) which is connected to the filter unit (52) through a second connecting pipe (55) and presses the cleaning solution filtered through the filter unit (52) at high pressure, and a third connecting pipe (56) connecting the high-pressure pump (54) to the cleaning solution spray pipe (30).

According to another feature of the present invention, the door (20) may include an upper door (21) whose rear end is coupled to an upper surface of the main body (10) to be rotatable in a vertical direction and which has a viewing window (21*a*) formed on a central portion thereof, a lower door (22) whose upper end is coupled to a front end portion of the upper door (21) to be rotatable in a front-rear direction, and a cylinder mechanism (23) connected to the upper door (21), the viewing window (21*a*) may be formed by coupling a transparent panel (21*c*) to an opening (21*b*) formed in the upper door (21), the fixing hole (22*a*) may be formed to pass through inner and outer sides of the lower door (22), the cylinder mechanism (23) may be formed to maintain an extended or contracted state and may have both ends rotatably coupled to a side surface of the main body (10) and a side surface of the upper door (21), and when the door (20) is opened or closed, the door (20) may be maintained in an open or closed state by the cylinder mechanism (23).

According to still another feature of the present invention, the fixing hole (22*a*) may be provided with an extension pipe portion (22*b*) extending inward and outward from the lower door (22), the sleeve (40) may be formed in a glove shape extending in the front-rear direction and having an inlet (42) formed on a rear end portion thereof, inserted into the extension pipe portion, and may have a flange portion (41), which is caught on an outer end of the extension pipe portion (22*b*), formed on the rear end portion, the manual high-pressure parts washer may further include a fixing cover (22*c*) which is coupled to a front end portion of the extension pipe portion (22*b*) so that the sleeve (40) is fixed to the extension pipe portion (22*b*), wherein the fixing cover (22*c*) may have a through hole (22*d*) formed in a central portion thereof and a coupling pipe portion (22*e*) coupled to an outer portion of the front end portion of the extension pipe portion (22*b*) provided on an outer portion thereof, and the through hole (22*d*) may have a support pipe portion (22*f*) which extends forward and is inserted into the front end portion of the sleeve (40).

According to yet another feature of the present invention, the manual high-pressure parts washer may further include a washing unit (60) which is provided below the upper door (21) and washes a lower surface of the transparent panel (21*c*), wherein the washing unit (60) may include a slider (61) provided below the upper door (21) and moved forward and rearward by forward and rearward movement driving units (62) provided at both sides thereof, a suction case (63) formed in a cylindrical shape extending laterally and having an open upper surface, provided above the slider (61), and moved upward and downward by an elevating driving unit (63*a*) provided on the slider (61), a scraper (64) which is provided on a front upper surface of the suction case (63), is in close contact with the lower surface of the transparent panel (21*c*) when the suction case (63) moves upward, and scrapes off and removes contaminants attached to the lower surface of the transparent panel (21*c*) when the slider (61) is slid rearward by the forward and rearward movement driving unit (62), and a discharge pipe (65) which connects the suction case (63) to the first connecting pipe (53) so that the contaminants removed by the scraper (64) and collected in the suction case (63) are discharged through the first connecting pipe (53).

According to yet another feature of the present invention, the manual high-pressure parts washer may further include a lighting lamp (70) which is provided on an inner rear side of the operation room (13) of the main body (10) and illuminates the operation room (13), wherein the lighting lamp (70) may include a pair of brackets (71) provided to be laterally spaced apart from each other on the inner rear side of the operation room (13), a transparent case (72) formed of a transparent synthetic resin material, which is formed in a cylindrical shape extending laterally and of which both ends are rotatably coupled to the brackets (71), a lamp main body (73) provided inside the transparent case (72), a driving motor (74) which is connected to the transparent case (72) and rotates the transparent case (72), and a washing bar (75) formed in a bar shape extending laterally and having both ends fixed to the brackets (71) and a front surface provided with a rubber contact member (**75*a*) in close contact with a rear surface of the transparent case (72) to be located behind the transparent case (72), wherein, when the transparent case (72) is rotated by the driving motor (74), the contact member (75*a*) removes contaminants attached to the transparent case (72**).

According to yet another feature of the present invention, the manual high-pressure parts washer may further include a power switch (81) provided on one side of the main body (10), a control switch (82) provided in front of the main body (10) and manipulated by an operator stepping thereon, a vibration detection sensor (83) provided on an upper surface of the transparent panel (**21*c*), a cleaning solution detection sensor (84) which is provided on a central portion of the cleaning solution spray pipe (30) and detects the cleaning solution passing through the cleaning solution spray pipe (30), and a control unit (85) which receives signals of the power switch (81), the control switch (82), the vibration detection sensor (83), and the cleaning solution detection sensor (84) and controls operations of the water supply unit (50), the washing unit (60), and the lighting lamp, wherein the control unit (85) may turn the lamp main body (73) on to illuminate an interior of the operation room (13) when the power switch (81) is turned on, drive the water supply unit (50) to supply the cleaning solution to the cleaning solution spray pipe (30) when an operator manipulates the control switch (82), check this through the vibration detection sensor (83) when the operator allows the cleaning solution spray pipe (30) to face the transparent panel (21*c*) so that the cleaning solution sprayed from the cleaning solution spray pipe (30) is sprayed onto the transparent panel (21*c*) through the cleaning solution spray pipe (30) and drive the washing unit (60) to wash the lower surface of the transparent panel (21*c*), and check this through the cleaning solution detection sensor (84) when the cleaning solution passes through the cleaning solution spray pipe (30) and drive the driving motor (74) to rotate the transparent case (72) so that the contaminants attached to the transparent case (72**) are removed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
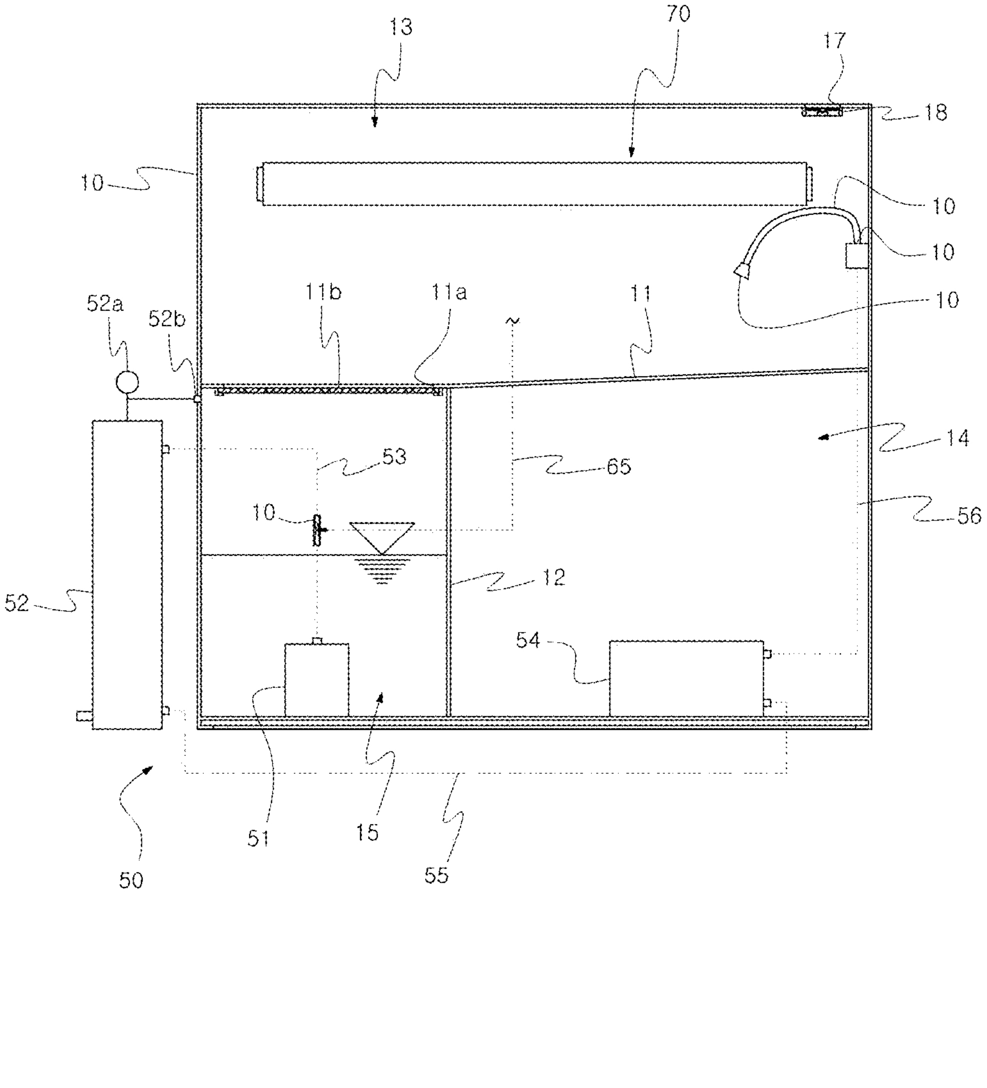
FIG. 1 is a front cross-sectional view showing a manual high-pressure parts washer according to the present invention.

Hereinafter, the present invention will be described in detail with reference to the accompanying exemplary drawings.

FIGS. 1 to 10 show a manual high-pressure parts washer according to the present invention, including a main body 10 whose internal space is divided into an operation room 13 at an upper side, a machine room 14 at a lower side, and a water storage room 15 by a partition 11 and a vertical plate 12 provided therein and in which an opening 16 opened or closed by a door 20 is formed at the upper side, a cleaning solution spray pipe 30 provided inside the main body 10, a glove-shaped sleeve 40 which is provided to extend into the operation room 13 through a fixing hole **22*a* formed in the door 20 and allow a user to insert his or her hand thereinto, a water supply unit 50 that supplies a cleaning solution stored in the water storage room 15 to the cleaning solution spray pipe 30, a washing unit 60 provided on the door 20, a lighting lamp 70 which is provided on an inner rear side of the operation room 13 of the main body 10 and illuminates the operation room 13, a power switch 81 provided at one side of the main body 10, a control switch 82 provided in front of the main body 10 and operated by the operator stepping thereon, a vibration detection sensor 83 provided on the door 20, a cleaning solution detection sensor 84 which is provided in a central portion of the cleaning solution spray pipe 30 and detects a cleaning solution passing through the cleaning solution spray pipe 30, and a control unit 85 which receives signals of the power switch 81, the control switch 82, the vibration detection sensor 83, and the cleaning solution detection sensor 84 and controls the operation of the water supply unit 50, the washing unit 60**, and the lighting lamp.

More specifically, the main body 10 is formed in a rectangular cylinder shape extending in a vertical direction.

The partition 11 is disposed to be inclined downward to the left from an inner central portion of the main body 10 and has the operation room 13 formed thereabove.

The vertical plate 12 is provided to extend vertically below the partition 11, upper and lower ends thereof are watertightly coupled to a lower surface of the partition 11 and an inner bottom plate of the main body 10, and as shown in FIG. 1, a space below the partition 11 is divided into the machine room 14 at the right side and the water storage room 15 at the left side.

In this case, a through hole 11*a* connecting the operation room 13 to the water storage room 15 is formed in a left side surface of the partition 11, and a filter member 11*b* is provided in the through hole 11*a*.

The filter member 11*b* serves to primarily filter large contaminants included in the cleaning solution passing through the through hole 11*a*.

Accordingly, as will be described below, when parts disposed inside the operation room 13 are washed, the contaminants removed from the parts and the cleaning solution are discharged to the water storage room 15 through the filter member 11*b* so that large contaminants may be primarily filtered.

In addition, an exhaust hole 17 is formed in one side of the upper surface of the main body 10, and an exhaust fan 18 is provided in the exhaust hole 17, and as will be described below, when washing is performed inside the operation room 13, the exhaust fan 18 is operated to discharge moisture inside the operation room 13 to the outside, thereby minimizing fogging on a viewing window 21*a* provided on the door 20.

Figure 3:
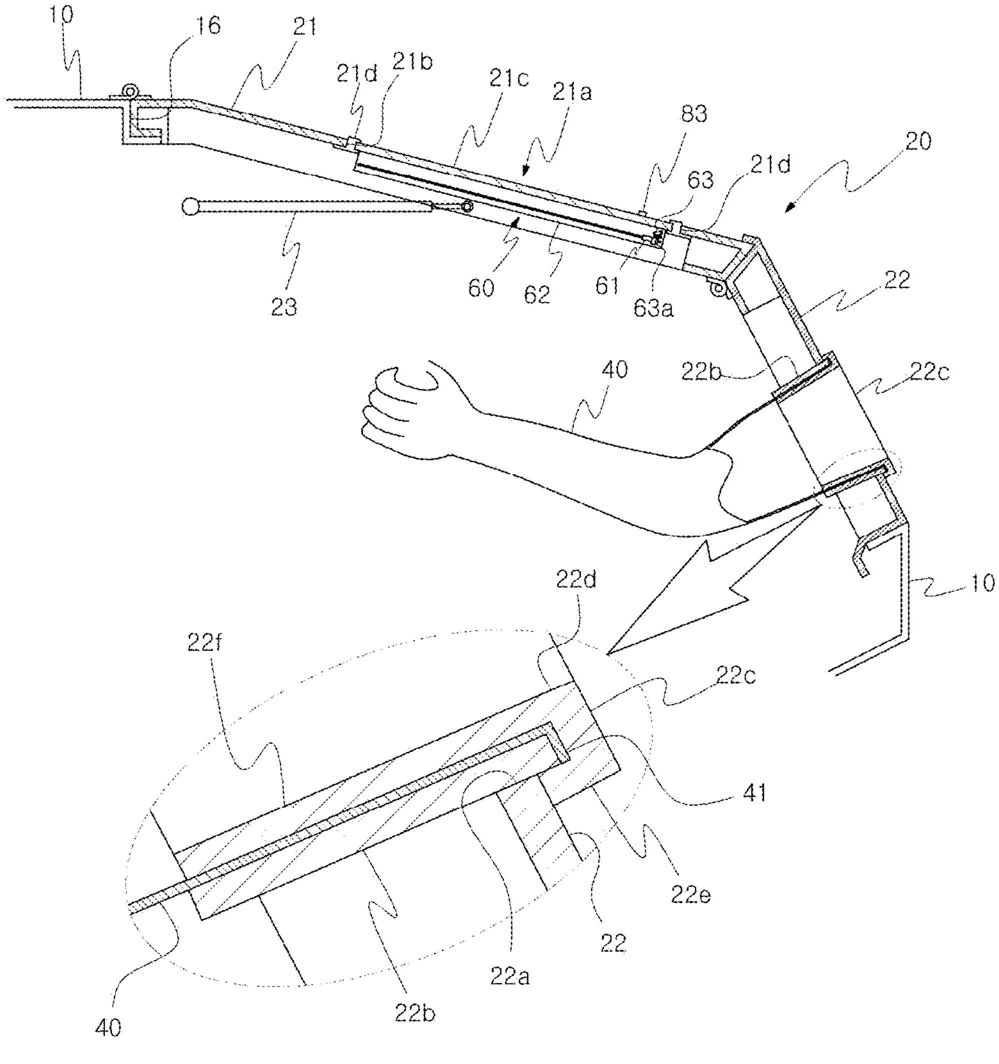
FIG. 3 is a side cross-sectional view showing a door of the manual high-pressure parts washer according to the present invention.

As shown in FIG. 3, the door 20 is composed of an upper door 21 whose rear end is coupled to the upper surface of the main body 10 to be rotatable in the vertical direction and which has the viewing window 21*a* formed on a central portion thereof, a lower door 22 whose upper end is coupled to a front end portion of the upper door 21 to be rotatable in a front-rear direction, and a cylinder mechanism 23 connected to the upper door 21.

The viewing window 21*a* is formed by coupling a transparent panel 21*c* to an opening 21*b* formed in the upper door 21.

In this case, since a frame member 21*d* formed of a synthetic resin material is coupled to an outer surface of the transparent panel 21*c*, and the frame member 21*d* is coupled to the upper door 21 with a screw (not shown), when the transparent panel 21*c* is damaged, the screw may be loosened and the transparent panel 21*c* can be easily replaced.

The fixing hole 22*a* is formed to pass through inner and outer surfaces of the lower door 22, and an extension pipe portion 22*b* extending inward and outward from the lower door 22 is provided in the fixing hole 22*a*.

The cylinder mechanism 23 is formed to maintain an extended or contracted state and has both ends rotatably coupled to a side surface of the main body 10 and a side surface of the upper door 21.

Since the cylinder mechanism 23 is generally provided in a trunk or the like of a vehicle, the detailed description thereof will be omitted.

Figure 4:
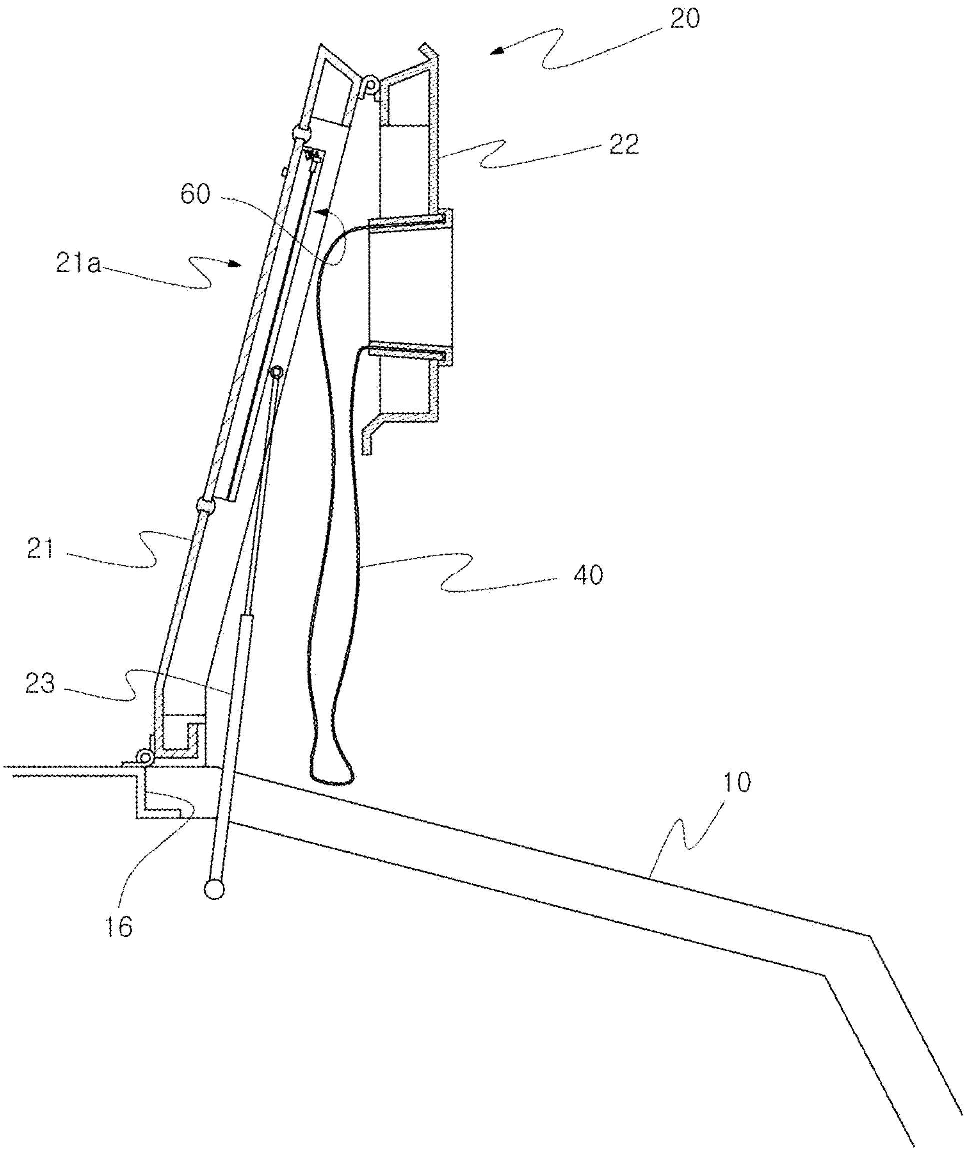
FIG. 4 is a side cross-sectional view showing a door of the manual high-pressure parts washer in an open state according to the present invention.

Accordingly, as shown in FIG. 4, when the operator rotates the upper door 21 upward, the lower door 22 is also lifted upward together with the upper door 21 to open the opening 16, and the upper door 21 and the lower door 22 are fixed after being rotated upward by the cylinder mechanism 23.

Conversely, as shown in FIG. 3, when the operator rotates the upper door 21 downward, the upper door 21 and the lower door 22 block the opening 16, and the upper door 21 and the lower door 22 are fixed by the cylinder mechanism 23 while blocking the opening 16.

Figure 2:
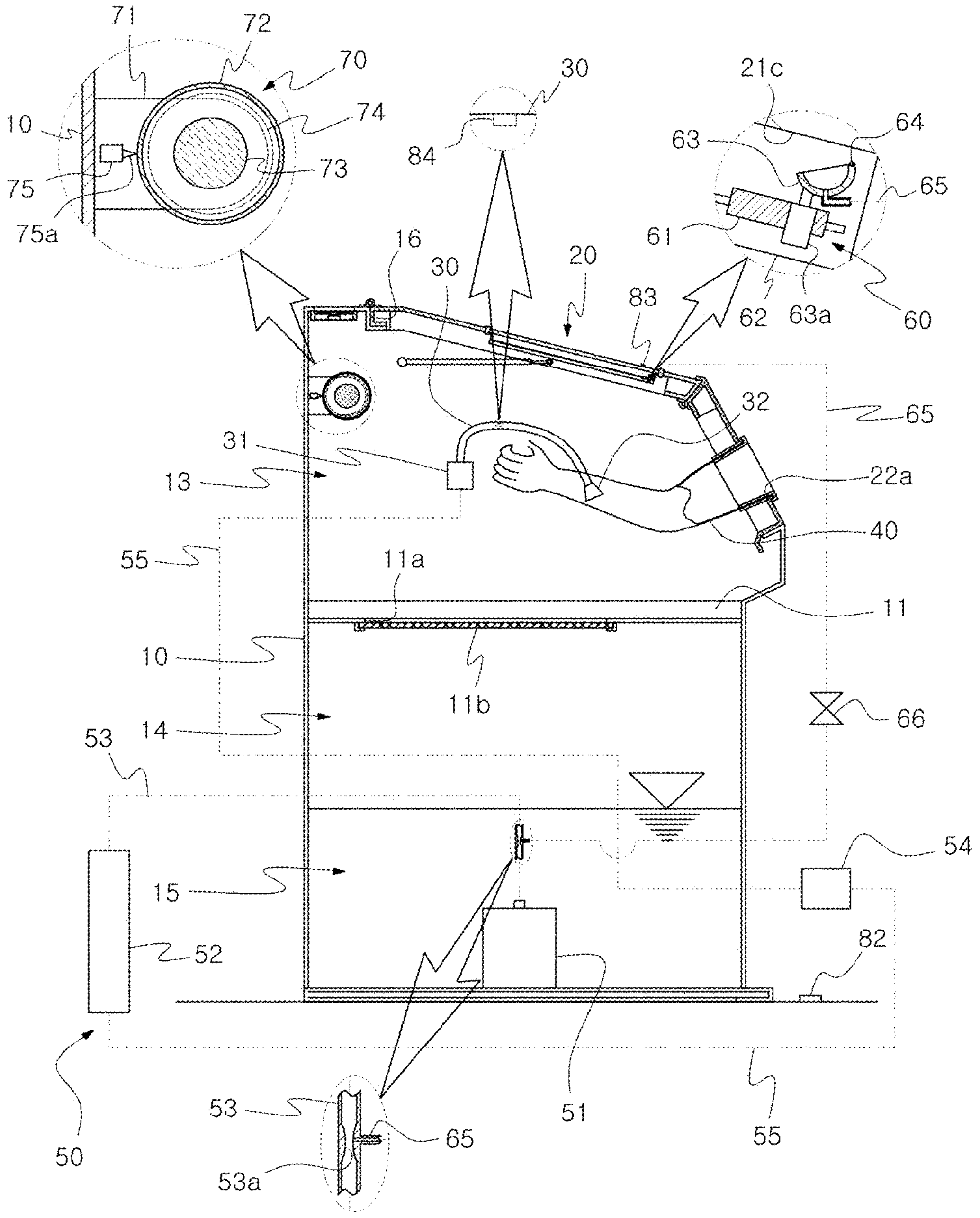
FIG. 2 is a side cross-sectional view showing a manual high-pressure parts washer according to the present invention.

As shown in FIGS. 1 and 2, the cleaning solution spray pipe 30 is formed of a flexible material that may withstand high pressure, a base end is connected to a fixing member 31 provided on one inner side of the main body 10, and a shower nozzle 32 is provided on a front end, thereby enabling the user to hold the cleaning solution spray pipe 30 with his or her hand and freely bend the cleaning solution spray pipe 30 to freely adjust a direction of the cleaning solution sprayed from the shower nozzle 32.

Figure 5:
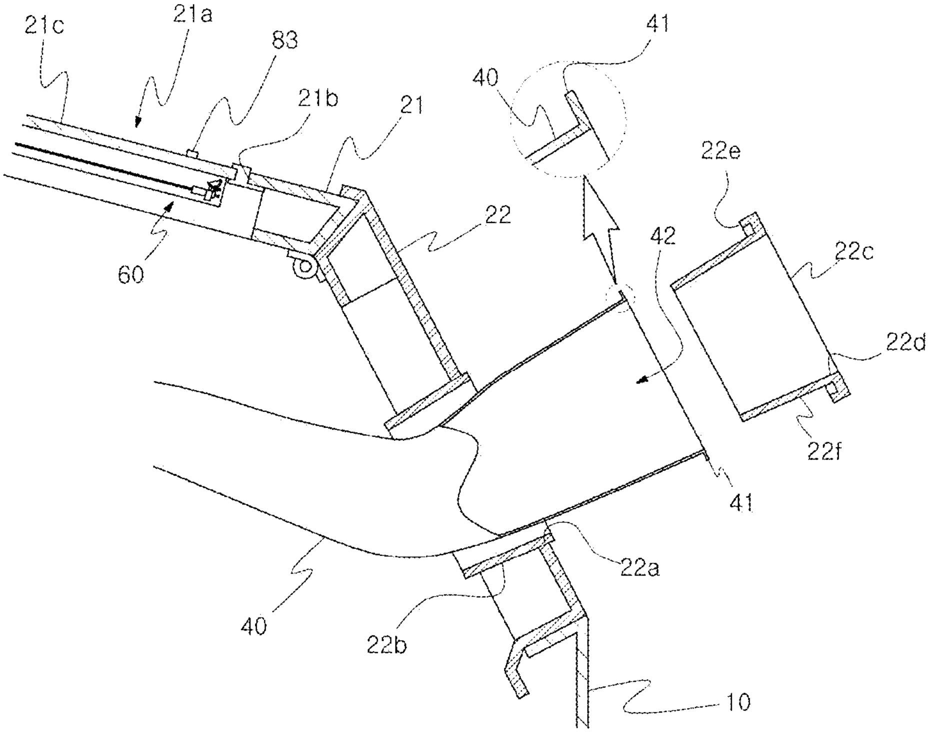
FIG. 5 is a side cross-sectional view showing a method of fixing a sleeve of the manual high-pressure parts washer according to the present invention.

As shown in FIGS. 3 and 5, the sleeve 40 is formed in a glove shape which extends in the front-rear direction with an inlet 42 formed on a rear end portion thereof, formed of a high-strength rubber material, formed for an upper arm to be inserted through the inlet 42 formed on the rear end portion, and fixedly inserted into the extension pipe portion 22*b*.

To this end, a flange portion 41 caught on an outer end of the extension pipe portion 22*b* is formed on a rear end portion of the sleeve 40, and a fixing cover 22*c* that fixes the sleeve 40 to the extension pipe portion 22*b* is coupled to a front end portion of the extension pipe portion 22*b*.

The fixing cover 22*c* has a through hole 22*d* formed in a central portion thereof and a coupling pipe portion 22*e* coupled to an outer portion of the front end portion of the extension pipe portion 22*b* provided on an outer portion thereof, and the through hole 22*d* has a support pipe portion 22*f* that extends forward and is inserted into the front end portion of the sleeve 40.

Accordingly, as shown in FIG. 3, when the sleeve 40 is inserted into the extension pipe portion 22*b* so that the flange portion 41 is coupled to be caught on the front end portion of the extension pipe portion 22*b* and the fixing cover 22*c* is coupled so that the support pipe portion 22*f* is inserted into the front end portion of the sleeve 40 through the inlet 42, the coupling pipe portion 22*e* of the fixing cover 22*c* is coupled to the outside of the extension pipe portion 22*b* so that the sleeve 40 is inserted between the extension pipe portion 22*b* and the support pipe portion 22*f* and fixed without moving.

In addition, when the sleeve 40 is damaged, as shown in FIG. 5, the sleeve 40 can be easily separated by being pulled forward after the fixing cover 22*c* is separated, and a new sleeve 40 can be easily coupled.

As shown in FIGS. 1 and 2, the water supply unit 50 includes a submersible pump 51 that is provided in the water storage room 15 and presses and discharges the cleaning solution stored in the water storage room 15, a filter unit 52 that is connected to the submersible pump 51 through a first connecting pipe 53 and filters the cleaning solution supplied from the submersible pump 51, a high-pressure pump 54 that is connected to the filter unit 52 through a second connecting pipe 55 and presses the cleaning solution filtered through the filter unit 52 at high pressure, and a third connecting pipe 56 connecting the high-pressure pump 54 to the cleaning solution spray pipe 30.

The submersible pump 51 is provided on an inner floor of the water storage room 15 and is provided to submerge in the cleaning solution stored therein, and when operated, presses the cleaning solution at low pressure and supplies the pressed cleaning solution to the filter unit 52.

The filter unit 52 is provided on one outer side of the main body 10 and provided with a filter that filters fine contaminants included in the cleaning solution, thereby enabling the cleaning solution that has passed through the filter unit 52 to be filtered cleanly.

In this case, a pressure gauge 52*a* and an air discharge valve 52*b* are provided on an upper end of the filter unit 52.

The high-pressure pump 54 is formed to press the cleaning solution that has passed through the filter unit 52 at high pressure and supply the pressed cleaning solution to the cleaning solution spray pipe 30.

Figure 6:
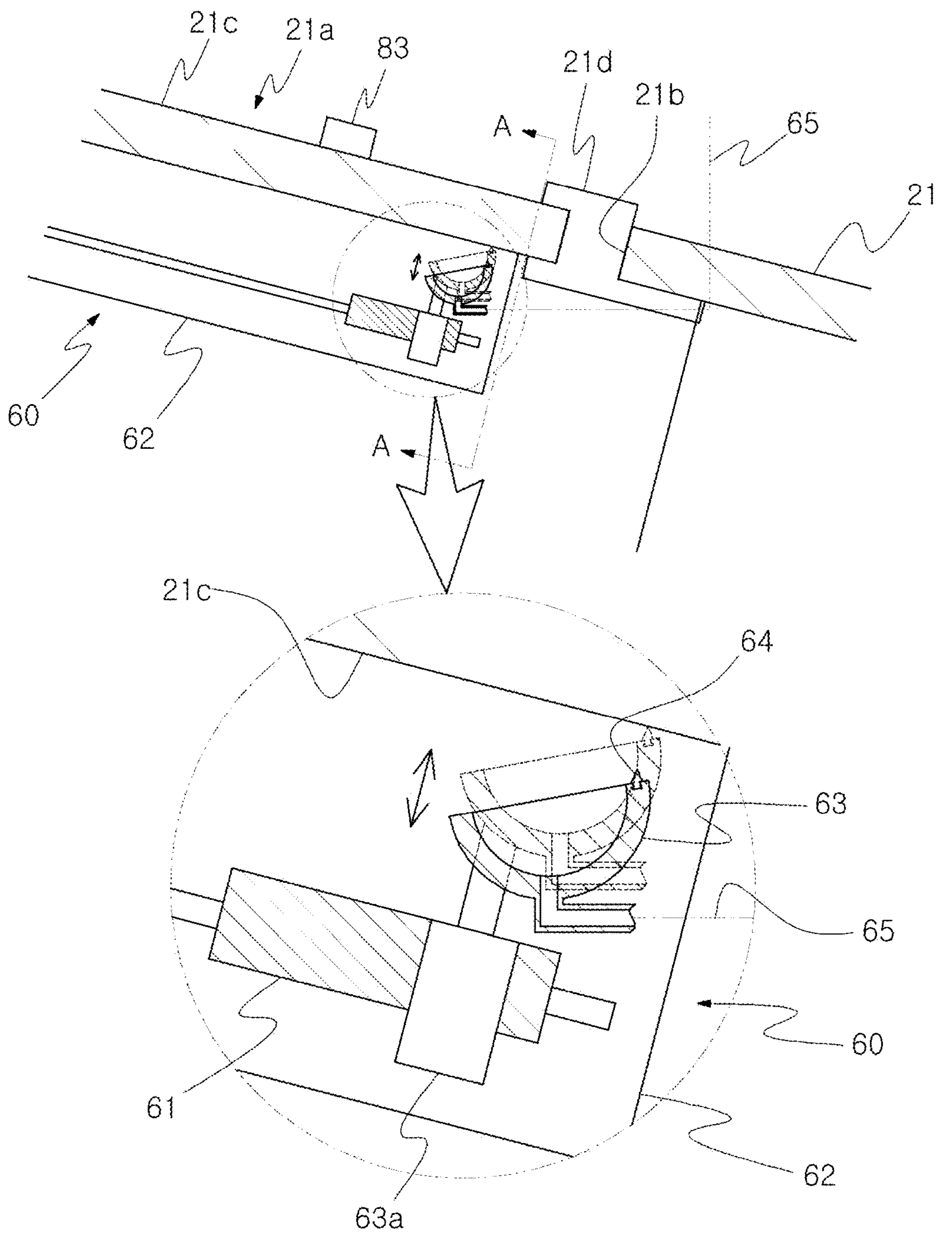
FIG. 6 is a side cross-sectional view showing a washing unit of the manual high-pressure parts washer according to the present invention.
Figure 7:
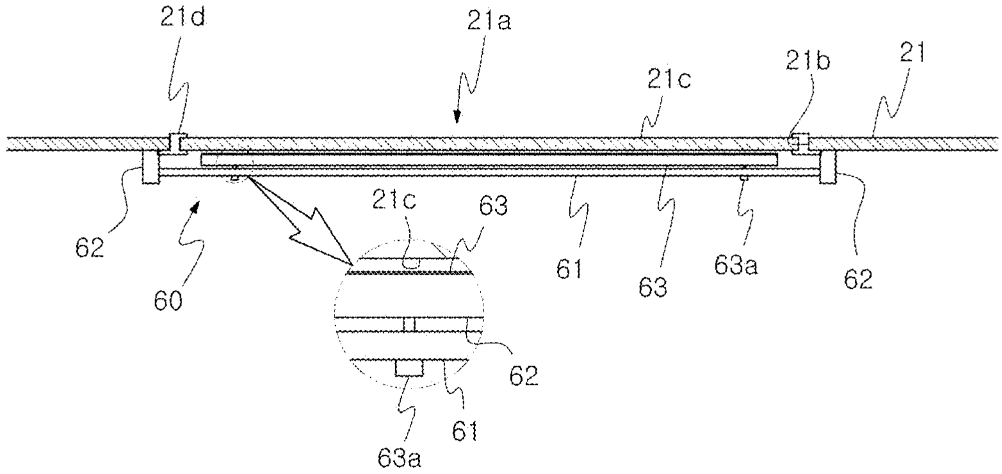
FIG. 7 is a front cross-sectional view along line A-A in FIG. 6.

As shown in FIGS. 6 and 7, the washing unit 60 includes a slider 61 provided below the upper door 21 and moved forward and rearward by forward and rearward movement driving units 62 provided at both sides thereof, a suction case 63 that is formed in a cylindrical shape extending laterally and having an open upper surface and moved forward and rearward by an elevating driving unit 63*a* provided on the slider 61, a scraper 64 that is provided on a front upper surface of the suction case 63, comes into close contact with a lower surface of the transparent panel 21*c* when the suction case 63 is moved upward, and scrapes off and removes contaminants attached to the lower surface of the transparent panel 21*c* when the slider 61 is slid rearward by the forward and rearward movement driving units 62, and a discharge pipe 65 connecting the suction case 63 to the first connecting pipe 53 so that the contaminants removed by the scraper 64 and collected in the suction case 63 are discharged to the first connecting pipe 53.

The slider 61 is formed to have a lateral length that is slightly greater than a lateral length of the transparent panel 21*c*.

A rodless cylinder that extends in the front-rear direction is fixed to both sides of a lower surface of the upper door 21 to be located at both sides of the viewing window 21*a*, and slides the slider 61 in the front-rear direction at a set speed when located at both sides of the slider and operated is used as the forward and rearward movement driving unit 62.

The suction case 63 is formed to have a cylindrical shape extending laterally and having an open upper surface inclined rearward.

An air cylinder extending vertically from a central portion of the slider 61 and having an upward extending piston rod connected to a lower surface of the suction case 63 is used as the elevating driving unit 63*a*.

In this case, the elevating driving unit 63*a* is formed as a plurality of elevating driving units that are provided to be laterally spaced apart from each other.

The scraper 64 is formed in a bar shape of a rubber material that extends laterally and is fixed to a front upper surface of the suction case 63.

The discharge pipe 65 is controlled by the control unit 85 and has a control valve 66 provided on a central portion thereof to open and close the central portion of the discharge pipe 65 using the control valve 66.

In this case, as shown in FIG. 2, when a Venturi portion 53*a* to which the discharge pipe 65 is connected is provided on a central portion of the first connecting pipe 53 and the cleaning solution pressed by the submersible pump 51 passes through the Venturi portion 53*a*, vacuum pressure is applied to the interior of the discharge pipe 65 so that the contaminants and cleaning solution collected inside the suction case 63 are suctioned into the first connecting pipe 53.

Figure 8:
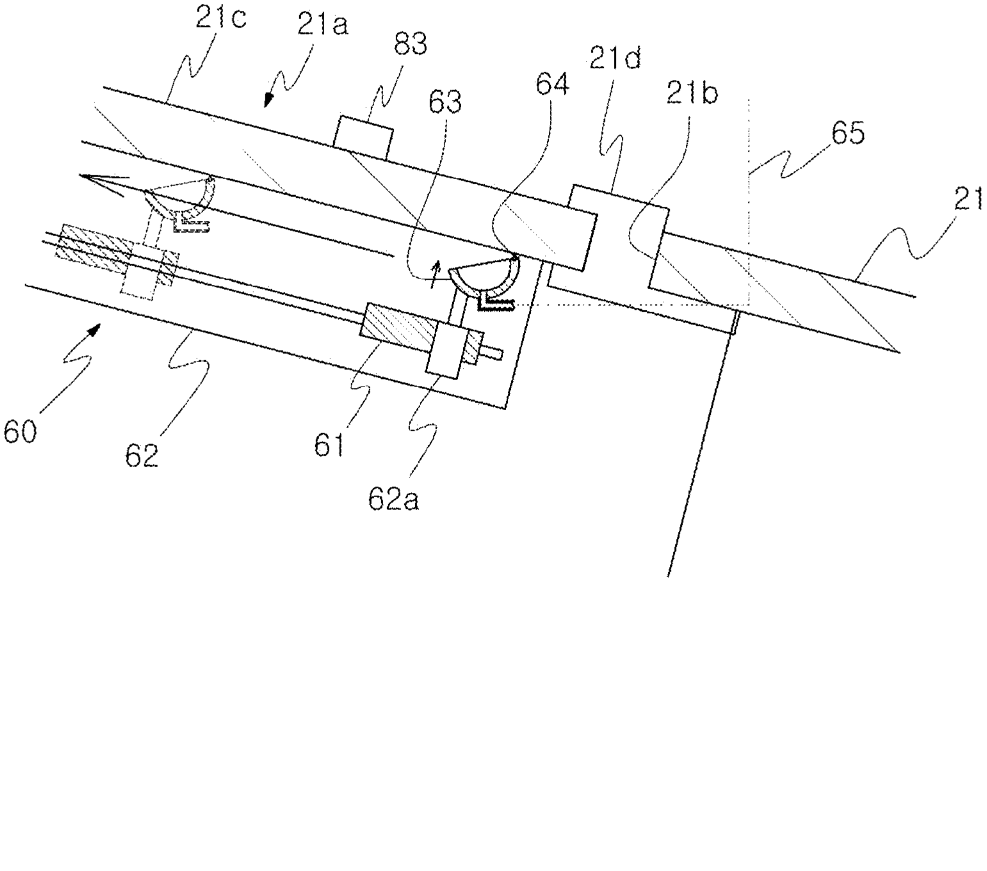
FIG. 8 is a reference view showing the operation of the washing unit of the manual high-pressure parts washer according to the present invention.

Accordingly, as shown in FIG. 8, when the suction case 63 is moved upward by the elevating driving unit 63*a* in a state in which the slider 61 is slid forward, the scraper 64 comes into close contact with the lower surface of the transparent panel 21*c*, and as shown by a dotted line in FIG. 8, when the slider 61 is slid rearward by the forward and rearward movement driving unit 62, the scraper 64 scrapes off the contaminants and cleaning solution attached to the lower surface of the transparent panel 21*c* so that the contaminants and cleaning solution are collected inside the suction case 63.

In this case, since the discharge pipe 65 is connected to the suction case 63, when the control valve 66 is opened, the contaminants are removed through the filter unit 52 after the contaminants and cleaning solution collected in the suction case 63 are supplied to the first connecting pipe 53 through the discharge pipe 65.

In addition, when the slider 61 is completely slid rearward, the suction case 63 is moved downward by the elevating driving unit 63*a*, and the slider 61 is returned to the front by the forward and rearward movement driving unit 62.

In addition, by repeating the above process, the contaminants and cleaning solution attached to the lower surface of the transparent panel 21*c* can be removed, thereby keeping the transparent panel 21*c* clean.

Figure 9:
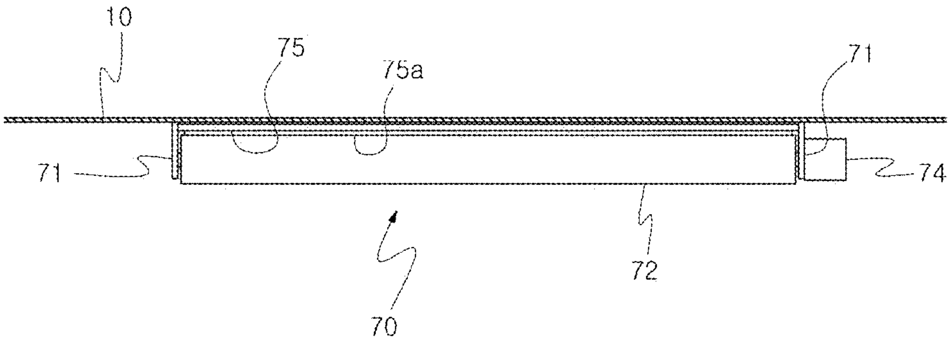
FIG. 9 is a plan cross-sectional view showing a lighting lamp of the manual high-pressure parts washer according to the present invention.
Figure 10:
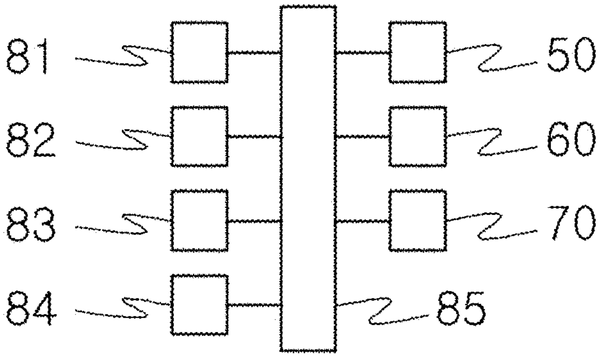
FIG. 10 is a block diagram of the manual high-pressure parts washer according to the present invention.

As shown in FIGS. 2 and 9, the lighting lamp 70 includes a pair of brackets 71 provided to be laterally spaced apart from each other on an inner rear side of the operation room 13, a transparent case 72 formed of a transparent synthetic resin material, which is formed in a cylindrical shape extending laterally and of which both ends are rotatably coupled to the bracket 71, a lamp main body 73 provided inside the transparent case 72, a driving motor 74 which is connected to the transparent case 72 and rotates the transparent case 72, and a washing bar 75 formed in a bar shape extending laterally and having both ends fixed to the brackets 71 and a front surface provided with a rubber contact member 75*a* in close contact with a rear surface of the transparent case 72 to be located behind the transparent case 72.

A light emitting diode (LED) lamp formed in the form of a fluorescent lamp that irradiates light to the entire outer surface and has both ends fixed to both inner sides of the transparent case 72 is used as the lamp main body 73 so that the lamp main body 73 rotates together with the transparent case 72.

Accordingly, when the transparent case 72 is rotated by the driving motor 74, the contact member 75*a* scrapes off and removes the contaminants attached to the transparent case 72, thereby maintaining the transparent case 72 in a transparent state.

The control switch 82 is provided on a front bottom surface of the main body 10.

The vibration detection sensor 83 is fixed to an upper surface of the transparent panel 21*c* to detect an impact applied to the transparent panel 21*c* when the user adjusts a direction of the cleaning solution spray pipe 30 toward the lower surface of the transparent panel 21*c* and the cleaning solution sprayed from the cleaning solution spray pipe 30 collides with the lower surface of the transparent panel 21*c*.

The cleaning solution detection sensor 84 is provided inside the cleaning solution spray pipe 30 and detects when the cleaning solution supplied by the water supply unit 50 passes through the cleaning solution spray pipe 30.

A method of washing parts using a manual high-pressure parts washer configured in this way will now be described.

First, when an operator turns the power switch 81 on, the control unit 85 turns the lamp main body 73 on to illuminate the interior of the operation room 13.

In addition, when the operator opens the door 20, arranges the parts inside the operation room 13, closes the door 20, holds the cleaning solution spray pipe 30 in his or her hand with his or her hand inserted into the sleeve 40, and manipulates the control switch 82 with his or her foot, the control unit 85 drives the water supply unit 50 to supply the cleaning solution to the cleaning solution spray pipe 30.

Accordingly, the operator may wash the parts by manually adjusting the direction of the cleaning solution spray pipe 30 and the parts so that the cleaning solution is sprayed to each portion of the parts.

In this case, the cleaning solution sprayed onto the parts and the contaminants removed from the parts are discharged and stored in the water storage room 15 after the contaminants are primarily removed through the filter member 11*b*, then supplied to the cleaning solution spray pipe 30 by the water supply unit 50, and circulated repeatedly.

Meanwhile, upon receiving a signal of the cleaning solution detection sensor 84 and detecting that the cleaning solution supplied from the water supply unit 50 passes through the cleaning solution spray pipe 30, the control unit 85 drives the driving motor 74 to slowly rotate the transparent case 72 of the lighting lamp 70, thereby removing the contaminants and cleaning solution attached to the transparent case 72.

That is, since the transparent case 72 is provided to be exposed at the inner rear side of the operation room 13, when the parts are washed using the cleaning solution, a cleaning solution splashed after colliding with the parts and the contaminants removed from the parts may be attached to the transparent case 72 to obscure the light of the lamp main body 73.

Accordingly, when the cleaning solution does not pass through the cleaning solution spray pipe 30, that is, when no washing operation is performed, the transparent case 72 is stopped to prevent the transparent case 72 from being scratched by the contact member 75*a*, and when the cleaning solution passes through the cleaning solution spray pipe 30 during the washing operation, the transparent case 72 is rotated to remove the contaminants and cleaning solution attached to the transparent case 72, thereby keeping the transparent case 72 clean.

In addition, when the operator allows the cleaning solution spray pipe 30 to face the transparent panel 21*c* so that the cleaning solution sprayed from the cleaning solution spray pipe 30 is sprayed onto the lower surface of the transparent panel 21*c* through the cleaning solution spray pipe 30, the control unit 85 checks this through the vibration detection sensor 83 and drives the washing unit 60 to wash the lower surface of the transparent panel 21*c*.

That is, when the parts are washed, the cleaning solution and the contaminants removed from the parts may be attached to the lower surface of the transparent panel 21*c* and obscure the transparent panel 21*c*, and when the operator allows the cleaning solution spray pipe 30 to face the transparent panel 21*c*, the washing unit 60 is automatically operated to remove the cleaning solution and contaminants attached to the transparent panel 21*c*, thereby easily wiping the transparent panel 21*c* clean.

The manual high-pressure parts washer configured in this way may include a main body 10 whose internal space is divided into an operation room 13 at an upper side, a machine room 14 at a lower side, and a water storage room 15 by a partition 11 and a vertical plate 12 provided therein and in which an opening 16 opened or closed by a door 20 is formed at the upper side, a cleaning solution spray pipe 30 provided inside the main body 10, a glove-shaped sleeve 40 which is provided to extend into the operation room 13 through a fixing hole 22*a* formed in the door 20 and allow a user to insert his or her hand thereinto, and a water supply unit 50 that supplies the cleaning solution stored in the water storage room 15 to the cleaning solution spray pipe 30, and thus the operator can arrange the parts inside the operation room 13 and spray the cleaning solution supplied to the cleaning solution spray pipe 30 onto the parts to wash the parts.

Accordingly, the manual high-pressure parts washer has a simple structure and can easily wash the parts.

In particular, the water supply unit 50 includes the submersible pump 51 provided in the water storage room 15 to press and discharge the cleaning solution stored in the water storage room 15, the filter unit 52 which is connected to the submersible pump 51 through the first connecting pipe 53 and filters the cleaning solution supplied from the submersible pump 51, the high-pressure pump 54 which is connected to the filter unit 52 through the second connecting pipe 55 and presses the cleaning solution filtered through the filter unit 52 at high pressure, and the third connecting pipe 56 which connects the high-pressure pump 54 to the cleaning solution spray pipe 30, supplies the cleaning solution supplied to the filter unit 52 at low pressure using the submersible pump 51, presses the cleaning solution filtered through the filter unit 52 at high pressure using the high-pressure pump 54, and supplies the pressed cleaning solution to the cleaning solution spray pipe 30.

Accordingly, it is possible to prevent the parts of the high-pressure pump 54 from being worn out and shortened in life due to the contaminants included in the cleaning solution and effectively supply the high-pressure cleaning solution to the cleaning solution spray pipe 30.

In addition, the door 20 includes the upper door 21 whose rear end is coupled to the upper surface of the main body 10 to be rotatable in the vertical direction and which has the viewing window 21*a* formed on the central portion thereof, the lower door 22 whose upper end is coupled to the front end portion of the upper door 21 to be rotatable in the front-rear direction, and the cylinder mechanism 23 connected to the upper door 21, and the cylinder mechanism 23 is formed to maintain an extended or contracted state and has both ends rotatably coupled to the side surface of the main body 10 and the side surface of the upper door 21 so that the door 20 is maintained in a closed or open state by the cylinder mechanism 23.

Accordingly, when the door 20 is opened or closed, the upper door 21 and the lower door 22 are folded or unfolded to open or close the opening 16, and thus less force is required to open or close the door 20.

In addition, the fixing hole 22*a* has the extension pipe portion 22*b* extending inward and outward from the lower door 22, the flange portion 41 caught on the outer end of the extension pipe portion 22*b* is formed on the outer end of the sleeve 40, and the fixing cover 22*c* is coupled to the extension pipe portion 22*b*, thereby making it very easy to fix or replace the sleeve 40 using the fixing cover 22*c*.

In addition, the washing unit 60 which is provided below the upper door 21 and washes the lower surface of the transparent panel 21*c* is further included, and the washing unit 60 includes a slider 61 provided below the upper door 21 and moved forward and rearward by the forward and rearward movement driving units 62 provided at both sides thereof, the suction case 63 that is formed in a cylindrical shape extending laterally and having the open upper surface and moved forward and rearward by the elevating driving unit 63*a* provided on the slider 61, the scraper 64 that is provided on the front upper surface of the suction case 63, comes into close contact with the lower surface of the transparent panel 21*c* when the suction case 63 is moved upward, and scrapes off and removes contaminants attached to the lower surface of the transparent panel 21*c* when the slider 61 is slid rearward by the forward and rearward movement driving units 62, and the discharge pipe 65 connecting the suction case 63 to the first connecting pipe 53 so that the contaminants removed by the scraper 64 and collected in the suction case 63 are discharged to the first connecting pipe 53, thereby making it easy to remove the contaminants attached to the lower surface of the transparent panel 21*c* using the washing unit 60.

In addition, the lighting lamp 70 that illuminates the operation room 13 is provided on the inner rear side of the operation room 13 of the main body 10, and the lighting lamp 70 includes the pair of brackets 71 provided to be laterally spaced apart from each other on the inner rear side of the operation room 13, the transparent case 72 formed of a transparent synthetic resin material, which is formed in a cylindrical shape extending laterally and of which both ends are rotatably coupled to the bracket 71, the lamp main body 73 provided inside the transparent case 72, the driving motor 74 which is connected to the transparent case 72 and rotates the transparent case 72, and the washing bar 75 formed in a bar shape extending laterally and having both ends fixed to the brackets 71 and the front surface provided with the rubber contact member 75*a* in close contact with the rear surface of the transparent case 72 to be located behind the transparent case 72.

In addition, the power switch 81 provided on one side of the main body 10, the control switch 82 provided in front of the main body 10 and manipulated by the operator stepping thereon, the vibration detection sensor 83 provided on the upper surface of the transparent panel 21*c*, the cleaning solution detection sensor 84 which is provided on the central portion of the cleaning solution spray pipe 30 and detects the cleaning solution passing through the cleaning solution spray pipe 30, and the control unit 85 that receives the signals of the power switch 81, the control switch 82, the vibration detection sensor 83, and the cleaning solution detection sensor 84 and controls the operations of the water supply unit 50, the washing unit 60, and the lighting lamp are further provided, and the control unit 85 turns the lamp main body 73 on to illuminate the interior of the operation room 13 when the power switch 81 is turned on, drives the water supply unit 50 to supply the cleaning solution to the cleaning solution spray pipe 30 when the operator manipulates the control switch 82, checks it through the vibration detection sensor 83 when the operator allows the cleaning solution spray pipe 30 to face the transparent panel 21*c* and the cleaning solution sprayed from the cleaning solution spray pipe 30 is sprayed to the transparent panel 21*c* through the cleaning solution spray pipe 30 and drives the washing unit 60 to wash the lower surface of the transparent panel 21*c*, checks it through the cleaning solution detection sensor 84 when the cleaning solution passes through the cleaning solution spray pipe 30, and drives the driving motor 74 to rotate the transparent case 72 to remove the contaminants attached to the transparent case 72, and thus the lighting lamp 70 and the washing unit 60 can be easily controlled to remove the contaminants attached to the transparent case 72 of the lighting lamp 70 and the contaminants attached to the transparent panel 21*c*.

A manual high-pressure parts washer according to the present invention includes a main body 10 whose internal space is divided into an operation room 13 at a upper side, a machine room 14 at a lower side, and a water storage room 15 by a partition 11 and a vertical plate 12 provided therein and in which an opening 16 opened or closed by a door 20 is formed at the upper side, a cleaning solution spray pipe 30 provided inside the main body 10, a glove-shaped sleeve 40 which is provided to extend into the operation room 13 through a fixing hole 22*a* formed in the door 20 and allow a user to insert his or her hand thereinto, and a water supply unit 50 that supplies a cleaning solution stored in the water storage room 15 to the cleaning solution spray pipe 30, and thus the operator can arrange the parts inside the operation room 13 and spray the cleaning solution supplied to the cleaning solution spray pipe 30 onto the parts to wash the parts.

Accordingly, the manual high-pressure parts washer has a simple structure and can easily wash the parts.

What is claimed is:

1. A manual high-pressure parts washer comprising:

a main body (10) whose internal space is divided into an operation room (13) at an upper side, a machine room (14) at a lower side, and a water storage room (15) by a partition (11) and a vertical plate (12) provided therein and in which an opening (16) opened or closed by a door (20) is formed at the upper side;

a cleaning solution spray pipe (30) provided inside the main body (10);

a sleeve (40) having a glove shape which is provided to extend into the operation room (13) through a fixing hole (22*a*) formed in the door (20) and allows a user to insert his or her hand thereinto;

a water supply unit (50) which supplies a cleaning solution stored in the water storage room (15) to the cleaning solution spray pipe (30); and a lighting lamp (70) which is provided on an inner rear side of the operation room (13) of the main body (10) and illuminates the operation room (13), wherein a through hole (11*a*) connecting the operation room (13) to the water storage room (15) is formed in the partition (11), a filter member (11*b*) is provided in the through hole (11*a*), and when a part is disposed in the operation room (13) and the part is washed using the cleaning solution sprayed through the cleaning solution spray pipe (30), contaminants and the cleaning solution removed from the part are discharged to the water storage room (15) through the filter member (11*b*), the water supply unit (50) includes:

a submersible pump (51) provided in the water storage room (15) to press and discharge the cleaning solution stored in the water storage room (15);

a filter unit (52) which is connected to the submersible pump (51) through a first connecting pipe (53) and filters the cleaning solution supplied from the submersible pump (51);

a high-pressure pump (54) which is connected to the filter unit (52) through a second connecting pipe (55) and presses the cleaning solution filtered through the filter unit (52) at high pressure; and a third connecting pipe (56) connecting the high-pressure pump (54) to the cleaning solution spray pipe (30), the lighting lamp (70) includes:

a pair of brackets (71) provided to be laterally spaced apart from each other on an inner rear side of the operation room (13);

a transparent case (72) formed of a transparent synthetic resin material, which is formed in a cylindrical shape extending laterally and of which both ends are rotatably coupled to the brackets (71);

a lamp main body (73) provided inside the transparent case (72);

a driving motor (74) which is connected to the transparent case (72) and rotates the transparent case (72); and a washing bar (75) formed in a bar shape extending laterally and having both ends fixed to the brackets (71) to be located behind the transparent case (72) and a front surface provided with a rubber contact member (75*a*) in close contact with a rear surface of the transparent case (72), and when the transparent case (72) is rotated by the driving motor (74), the contact member (75*a*) removes contaminants attached to the transparent case (72).

2. The manual high-pressure parts washer of claim 1, wherein the door (20) includes:

an upper door (21) whose rear end is coupled to an upper surface of the main body (10) to be rotatable in a vertical direction and which has a viewing window (21*a*) formed on a central portion thereof;

a lower door (22) whose upper end is coupled to a front end portion of the upper door (21) to be rotatable in a front-rear direction; and a cylinder mechanism (23) connected to the upper door (21), the viewing window (21*a*) is formed by coupling a transparent panel (21*c*) to an opening (21*b*) formed in the upper door (21), the fixing hole (22*a*) is formed to pass through inner and outer sides of the lower door (22), the cylinder mechanism (23) is formed to maintain an extended or contracted state and has both ends rotatably coupled to a side surface of the main body 10 and a side surface of the upper door 21, and when the door (20) is opened or closed, the door (20) is maintained in an open or closed state by the cylinder mechanism (23).

3. The manual high-pressure parts washer of claim 2, wherein the fixing hole (22*a*) is provided with an extension pipe portion (22*b*) extending inward and outward from the lower door (22), the sleeve (40) is formed in the glove shape extending in the front-rear direction and having an inlet (42) formed on a rear end portion thereof, is inserted into the extension pipe portion, and has a flange portion (41), which is caught on an outer end of the extension pipe portion (22*b*), formed on the rear end portion, and the manual high-pressure parts washer further includes a fixing cover (22*c*) which is coupled to a front end portion of the extension pipe portion (22*b*) so that the sleeve (40) is fixed to the extension pipe portion (22*b*), wherein the fixing cover (22*c*) has a through hole (22*d*) formed in a central portion thereof and a coupling pipe portion (22*e*) coupled to an outer portion of the front end portion of the extension pipe portion (22*b*) provided on an outer portion thereof, and the through hole (22*d*) is provided with a support pipe portion (22*f*) which extends forward and is inserted into the front end portion of the sleeve (40).

4. The manual high-pressure parts washer of claim 2, further comprising a washing unit (60) which is provided below the upper door (21) and washes a lower surface of the transparent panel (21*c*), wherein the washing unit (60) includes:

a slider (61) provided below the upper door (21) and moved forward and rearward by forward and rearward movement driving units (62) provided at both sides thereof;

a suction case (63) formed in a cylindrical shape extending laterally and having an open upper surface, provided above the slider (61), and moved upward and downward by an elevating driving unit (63*a*) provided on the slider (61);

a scraper (64) which is provided on a front upper surface of the suction case (63), is in close contact with the lower surface of the transparent panel (21*c*) when the suction case (63) moves upward, and scrapes off and removes contaminants attached to the lower surface of the transparent panel (21*c*) when the slider (61) is slid rearward by the forward and rearward movement driving unit (62); and a discharge pipe (65) which connects the suction case (63) to the first connecting pipe (53) so that the contaminants removed by the scraper (64) and collected in the suction case (63) are discharged through the first connecting pipe (53).

5. The manual high-pressure parts washer of claim 4, further comprising:

a power switch (81) provided on one side of the main body (10);

a control switch (82) provided in front of the main body (10) and manipulated by an operator stepping thereon;

a vibration detection sensor (83) provided on an upper surface of the transparent panel (21*c*);

a cleaning solution detection sensor (84) which is provided on a central portion of the cleaning solution spray pipe (30) and detects the cleaning solution passing through the cleaning solution spray pipe (30); and a control unit (85) which receives signals of the power switch (81), the control switch (82), the vibration detection sensor (83), and the cleaning solution detection sensor (84) and controls operations of the water supply unit (50), the washing unit (60), and the lighting lamp, wherein the control unit (85) is configured to:

turn the lamp main body (73) on to illuminate an interior of the operation room (13) when the power switch (81) is turned on;

drive the water supply unit (50) to supply the cleaning solution to the cleaning solution spray pipe (30) when the operator manipulates the control switch (82);

check, through the vibration detection sensor 83, that the operator allows the cleaning solution spray pipe (30) to face the transparent panel (21*c*) and the cleaning solution sprayed from the cleaning solution spray pipe (30) is sprayed onto the transparent panel (21*c*) through the cleaning solution spray pipe (30), and drive the washing unit (60) to wash the lower surface of the transparent panel (21*c*); and check, through the cleaning solution detection sensor (84), that the cleaning solution passes through the cleaning solution spray pipe (30) and drive the driving motor (74) to rotate the transparent case (72) so that the contaminants attached to the transparent case (72) are removed.

* * * * *